United States Patent [19]

Saunders

[11] Patent Number: 5,178,206

[45] Date of Patent: Jan. 12, 1993

[54] THERMAL STORAGE CONTROL LOGIC FOR STORAGE HEATERS

[75] Inventor: David N. Saunders, Biddeford, Me.

[73] Assignee: American Stabilis, Inc., Lewiston, Me.

[21] Appl. No.: 528,482

[22] Filed: May 25, 1990

[51] Int. Cl.$^5$ .......................... H05B 1/02; F24H 7/02; F24D 11/00

[52] U.S. Cl. .......................... 165/1; 165/18; 165/12; 165/11.1; 392/345

[58] Field of Search ...................... 165/18, 1, 11.1, 12; 392/345

[56] References Cited

U.S. PATENT DOCUMENTS

| | | | |
|---|---|---|---|
| 3,958,101 | 5/1976 | Barabas | 392/345 |
| 3,975,620 | 8/1976 | Hallgreen et al. | 165/18 |
| 4,039,773 | 8/1977 | Iversen | 392/345 |
| 4,071,745 | 1/1978 | Hall . | |
| 4,097,719 | 6/1978 | Olsen et al. | 392/345 |
| 4,117,307 | 9/1978 | Iversen et al. | 392/345 |
| 4,146,085 | 3/1979 | Wills . | |
| 4,170,729 | 10/1979 | Lane et al. | 392/345 |
| 4,206,872 | 6/1980 | Levine . | |
| 4,213,032 | 7/1980 | Olsen et al. | 165/18 |
| 4,217,646 | 8/1980 | Caltagirone et al. . | |
| 4,234,782 | 11/1980 | Barabas et al. | 392/345 |
| 4,267,996 | 5/1981 | Neel et al. . | |
| 4,276,925 | 7/1981 | Palmieri . | |
| 4,292,811 | 10/1981 | Kamejima et al. | 165/18 |
| 4,298,163 | 11/1981 | Richardson et al. . | |
| 4,314,454 | 2/1982 | Kamejima et al. | 165/18 |
| 4,332,013 | 5/1982 | Chelcun et al. . | |
| 4,335,847 | 6/1982 | Levine . | |
| 4,455,095 | 6/1984 | Bleiker . | |
| 4,516,720 | 5/1985 | Chaplin . | |
| 4,542,849 | 9/1985 | Pichot et al. . | |
| 4,606,401 | 8/1986 | Levine et al. . | |
| 4,627,742 | 12/1986 | Sakamoto et al. . | |
| 4,639,876 | 1/1987 | Deeds . | |
| 4,645,908 | 2/1987 | Jones | 392/345 |
| 4,667,875 | 5/1987 | Strand et al. . | |
| 4,671,457 | 6/1987 | Berkhof . | |
| 4,685,615 | 8/1987 | Hart . | |
| 4,706,882 | 11/1987 | Barnard . | |
| 4,841,459 | 10/1989 | Ikeda et al. . | |
| 4,916,909 | 4/1990 | Mathen et al. | 165/18 |
| 4,940,079 | 7/1990 | Best et al. | 165/18 |

*Primary Examiner*—John K. Ford
*Attorney, Agent, or Firm*—Finnegan, Henderson, Farabow, Garrett & Dunner

[57] ABSTRACT

A method for thermal storage using an apparatus including an outdoor temperature sensor and at least one indoor zone temperature sensor, includes the steps of: estimating an average on-peak outdoor temperature for tomorrow by adding the average on-peak outdoor temperature for today to the current outdoor temperature minus the outdoor temperature at the same time yesterday; estimating the temperature difference in each zone between the outside on-peak temperature and the indoor on-peak temperature for that zone for tomorrow by subtracting the estimated average on-peak outdoor temperature for tomorrow from the average set point temperature in the respective zone for today; calculating the thermal charge by multiplying yesterday's actual off-peak charge by the estimated temperature difference in each zone divided by the average actual temperature in each zone for today's on-peak period; and charging the thermal storage system. The thermal charge is reduced by 50% if the zone sensor reads a temperature greater than 4° F. above the set point. The charge is 100% of the maximum charge if the temperature falls below 40° F. The charge is 100% of the maximum charge if the temperature falls 4° F. or more below the set point temperature.

3 Claims, 3 Drawing Sheets

THERMAL STORAGE CONTROL LOGIC FOR STORAGE HEATERS

BACKGROUND OF THE INVENTION

1. Field of the Invention

The invention relates to a heating system, and more specifically, to a method for storing a thermal charge for use in such a system.

2. Description of the Related Art

Storage heaters are available commercially which allow for an energy charge and then for later radiation of heat. In order to maximize the potential for energy savings using these storage heaters, a system is necessary which can anticipate the amount of heat which will be needed during on-peak utility hours and control charging of the heaters during off-peak utility hours when the energy is less expensive.

Conventional heating control systems, such as disclosed in U.S. Pat. Nos. 4,332,013 to Chelcum et al. and 4,217,646 to Caltagirone et al., control temperature in response to sensor inputs, but do not anticipate energy needs and charge heater storage units during off-peak hours in anticipation of those needs.

SUMMARY OF THE INVENTION

The present invention overcomes the problems and disadvantages of the prior art by providing a system and method for controlling heater/storage units. An object of the invention is allow charging during off-peak utility hours and heating during on-peak utility hours.

Additional objects and advantages of the invention will be set forth in part in the description which follows, and in part will be obvious from the description or may be learned by practice of the invention. The objects and advantages of the invention will be realized and attained by means of the elements, steps and combinations particularly pointed out in the appended claims.

To achieve the objects and in accordance with the purpose of the invention, as embodied and broadly described herein, the invention comprises a method for thermal storage comprising the steps of estimating tomorrow's on-peak heating requirements, and charging a thermal storage system during off-peak utility hours in response to the estimated on-peak heating requirements.

As preferably embodied herein, the step of estimating comprises the steps of estimating the difference between the on-peak outside temperature for tomorrow and the on-peak indoor temperature for tomorrow, and extrapolating tomorrow's on-peak heating requirements by multiplying yesterday's actual on-peak thermal output by a ratio of tomorrow's estimated on-peak difference to today's actual on-peak difference.

It is to be understood that both the forgoing general description and the following detailed description are exemplary and explanatory only and are not restrictive of the invention as claimed.

The accompanying drawings which are incorporated in and constitute part of the specification, illustrate one embodiment of the invention and together with the description serve to explain the principles of the invention.

DESCRIPTION OF THE PREFERRED EMBODIMENT

Reference will now be made in detail to the presently preferred embodiment of the invention, an example of which is illustrated in the accompanying drawings. Wherever possible, the same reference numbers will be used throughout the drawings to refer to the same or like parts.

Figure 1:
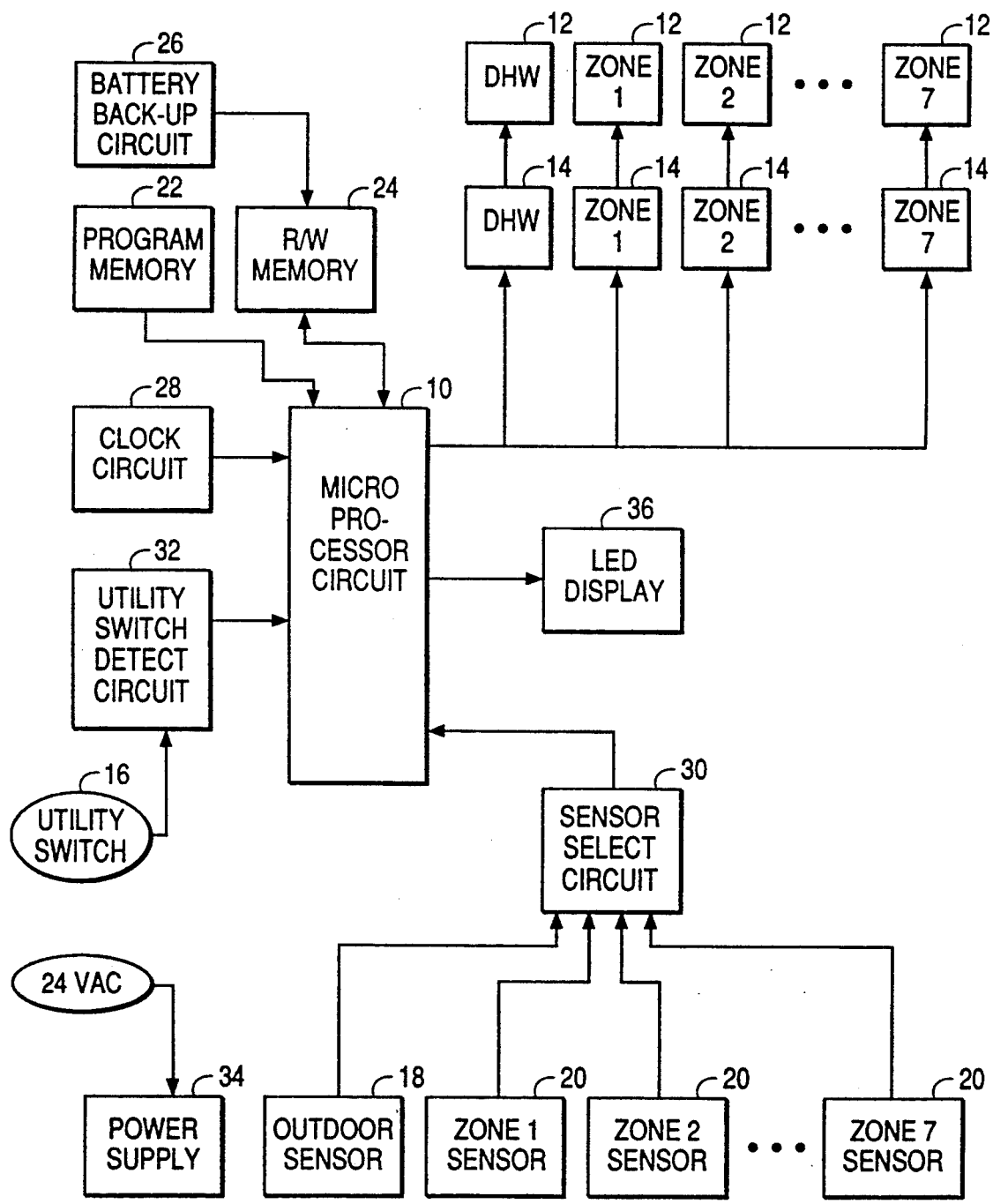
FIG. 1 is a diagram of a system employing the invention.

A storage heater control system employing the invention is shown in FIG. 1. The logical control of the method is microprocessor based Power supply 34 is used to provide regulated power to all elements of the system.

Contactors 12 control the zone heater/storage units and the domestic hot water (DHW), and are driven by contactor driver circuits 14. Contactors 12 are opened and closed in response to inputs from the utility meter 16, an outdoor sensor 18, and one or more zone sensors 20, as explained in more detail below. A zone as defined in this specification may be a room, a part of a room or a group of rooms.

The microprocessor operates according to commands stored in permanent program memory 22, and a read/write memory provides storage for program variables and for a history of system operation over the past few days. The read/write memory is preferably made nonvolatile by backup battery circuit having a replaceable lithium battery, which lasts approximately 1 year.

Clock circuit 28 provides microprocessor 10 with basic timing signals. The microprocessor can derive real time (i.e., hours and minutes) from the clock circuit signals.

Select circuit 30 is used by microprocessor 10 to select one sensor circuit at a time.

The state of utility switch 16 is determined by microprocessor 10 through utility switch detection circuit 32. That circuit indicates whether on-peak or off-peak rates are in effect.

Finally, LED (Light Emitting Diode) Status Display 36 preferably has four LEDs to indicate the clock operation, peak/off-peak time, measurement-in-progress, and emergency heat.

Figure 2:
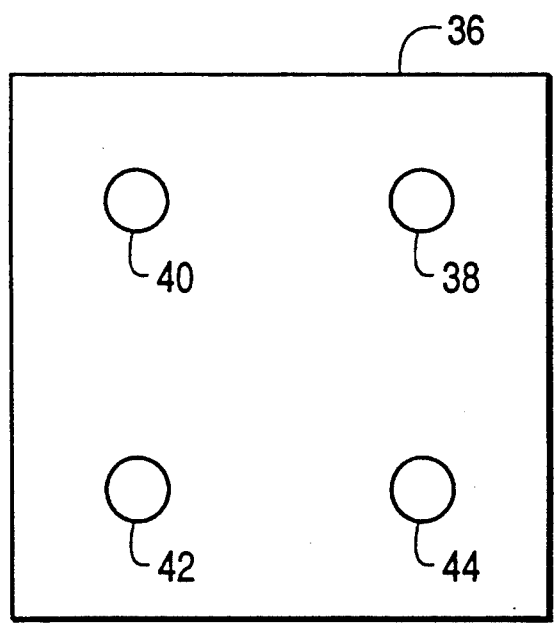
FIG. 2 is a representation of an LED Status Display as used in a system according to the invention.

LED Status Display 36 is shown in FIG. 2. LEDs (38, 40, 42 and 44) indicate the system status. Preferably, in operation, LED 38 indicates that the system is functioning, LED 40 indicates the system is in an off-peak period, LED 42 indicates zone sensors are being monitored, and LED 44 indicates that the system is providing emergency heat.

Conventional and commercially available storage heaters may be used which combine both heat energy storage and radiation functions. As an example, commercial units are available from Unidare Engineering Limited.

The program logic of this invention is designed to control, during off-peak hours, the charge period allowed for storing heat energy. It is based on inputs from outdoor sensor 18 and at least one indoor sensor 20. Detailed steps of the control logic are incorporated into EPROM program memory 22 which is programmed to accommodate different utility schedules.

As embodied herein and with reference to FIGS. 1 and 2, the system incorporates a self-test program which utilizes LED Status Display 36 to insure all components of the system are functional and properly installed. When the self-test begins, the system is powered up with a 120 volts alternating current and top right LED 38 begins to flash indicating that there is proper power to the circuit board. As the test proceeds, top right LED 38 will go out and bottom two LEDs 42 and 44 will begin alternatively flashing 10 times. During this period, all data is erased from the microprocessor. Once all the data is erased, bottom LEDs 42 and 44 will go out and top right LED 38 will again begin to flash. In order to test the circuitry from the meter input to the contactors, the signal from the meter can be simulated by using a jumper across the contacts of the meter closure terminal on the system master panel. Upon closing (or opening depending on the specific utility system) the terminal contacts, the drive contactors will begin to cycle on for about 2 seconds at about 1 second intervals. Assuming all the contactors on the master panel cycle properly, circuitry from the meter closure, through the microprocessor, and to the drive contactors is working properly.

The next step is to test the inputs to the system. First, outdoor sensor 18 is tested by plugging in the sensor to its input terminal. Once plugged in, top right LED 38 will go out. During this process, the system checks that it is reading a temperature. If a valid temperature reading is taken, top left LED 40 will verify the outside temperature sensing circuit is functional. The outdoor sensor 18 is then unplugged from the master panel. Top left LED 40 should go out and top right LED 38 will again begin to flash. Next, each zone sensor 20 circuit is tested. The zone 1 sensor is plugged into any zone input terminal on the master panel, and again top right LED will go out and the system will check that it is reading a valid temperature. If so, top left LED 40 will go on. Also, neither bottom left LED 42 or bottom right LED 44 will go on. By turning the temperature adjust knob on the sensor all the way to the right the system checks its ability to read temperature above the midpoint of the range (approximately 67° F.) and will turn on bottom right LED 44. When the knob is turned to the left of the midpoint, the system checks its ability to read temperatures below the midpoint of the range and will turn on bottom left LED 42. The system also allows the installer to calibrate the midpoint of the temperature adjust knob because both bottom LEDs will be on at the midpoint of the range. At this point, the temperature indicator knob should be set at 67°. Once the zone 1 test is complete the sensor is unplugged from the master panel. All the LEDs will go out and top right LED 38 should begin to flash. This procedure is repeated for every zone to insure that the circuitry of each zone is functional.

After every zone has been tested, the system is brought out of the self test mode to begin operation. During this process the system clears any data that it has accumulated from the self test. The system is initialized to start the first day operations by taking initial temperature readings of each zone and the outdoor temperature. During this time, bottom left LED 42 will be on, thereby signaling that temperature readings are being taken. Once the system has completed its temperature readings, bottom left LED 42 will go out and top left LED 40 will continue to flash, indicating that the system is initialized for first day operation.

Upon initial start-up, the system is programmed to charge the maximum number of off-peak hours allowed by the utility. This is done to assure heat in the space, as no history has been established, and to completely burn off any impurities and dust left in the heaters as quickly as possible. As a safety, the actual initial charge must be taken for at least half the allowable hours. If not, the next charge period will again be set for the maximum number of hours.

Figure 3:
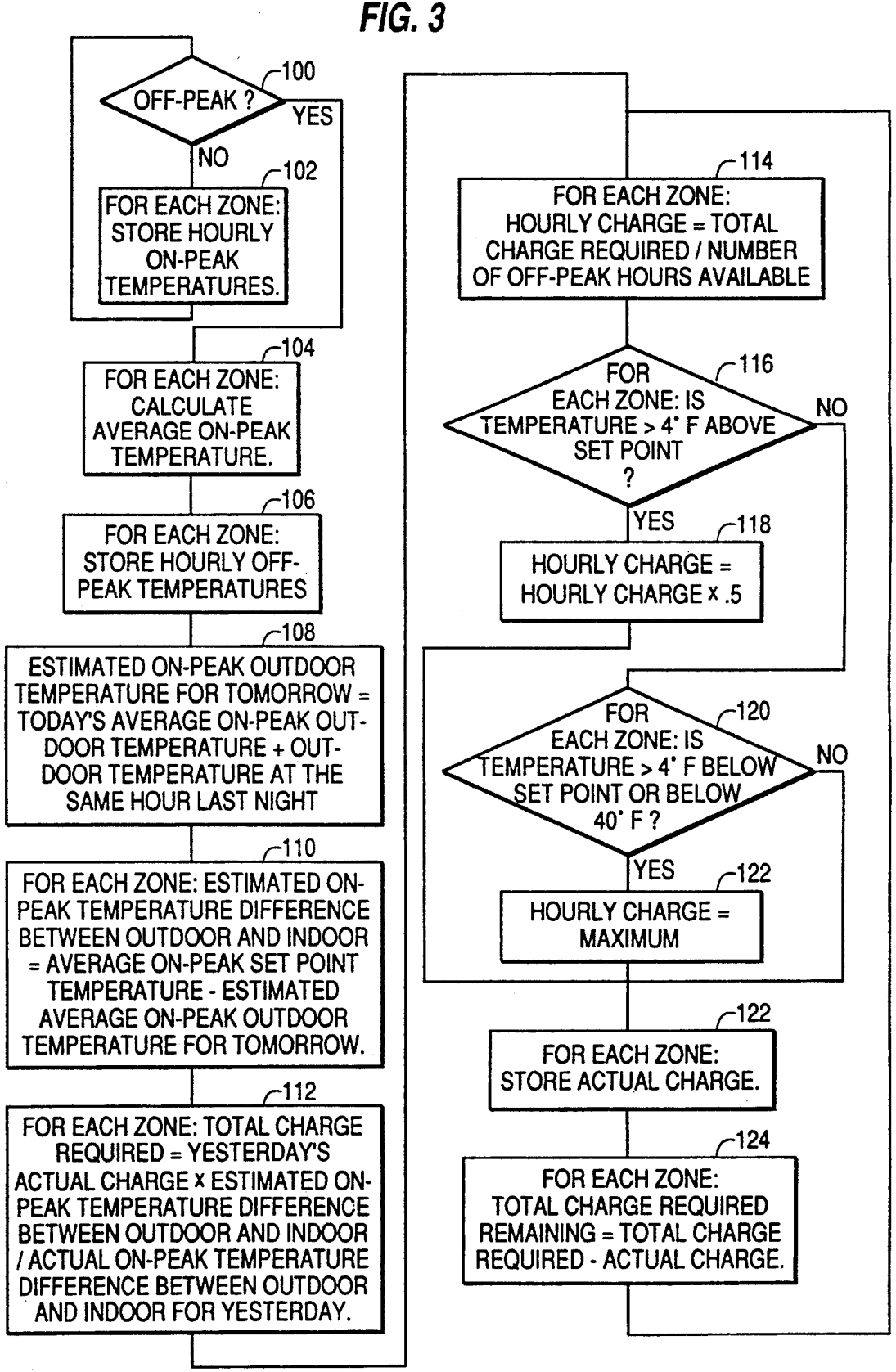
FIG. 3 is a flow diagram of logical control steps according to the invention.

The method of normal operation is discussed below with reference to FIG. 3.

In operation, in step 102, during the on-peak (daytime) period the system reads information once every hour from all the sensors connected to it, and writes this information to eight individual arrays in read/write memory 24. Upon the signal from the meter in step 100 that the off-peak period is beginning, the system calculates the average on-peak temperature for each zone including outdoors in step 104. This average on-peak temperature is stored for that day in read/write memory 24.

During the off-peak (nighttime) period in step 106, the system reads information once every hour from all the sensors connected to it, and writes this information to eight individual arrays. This hourly off-peak temperature reading from the outdoor sensor is retained in the read/write memory until the next day's reading replaces it. The indoor zone readings are not retained.

Upon the signal of "off-peak" from the meter in step 100, the system calculates the charge time for each off-peak hour by first estimating tomorrow's average on-peak outdoor temperature in step 108 by taking today's average on-peak outdoor temperature plus the current outdoor temperature minus the outdoor temperature at the same hour yesterday. The assumption is that tomorrow's temperature will follow today's trend.

In step 110, the system estimates the on-peak temperature difference between the outdoor temperature and the indoor temperature for each zone for tomorrow. This temperature difference is calculated by subtracting tomorrow's estimated average on-peak outdoor temperature from the average set point (thermostat setting) temperature in the zone for the day that just ended.

The total charge required by each zone is calculated in step 112 by multiplying yesterday's actual charge by the estimated on-peak temperature difference for tomorrow divided by the actual on-peak temperature difference for yesterday. This total required charge is carried in minutes and cannot exceed the maximum time allowed by the utility for off-peak charging.

In step 114, the total charge required for each zone is then divided into each hour of available off-peak time in the ratio of total charge required divided by maximum time allowed multiplied by 60 minutes. Each hourly required charge is then written into an array in read/write memory 24 for each hour of the off-peak time and maintained in memory until replaced by the next hour's (for upcoming hours) or next day's (for past hours) calculations.

The process of step 114 is repeated every hour of the off-peak time and the required charge is recalculated for the remaining hours. Additionally, the actual charge delivered for the hour is written into an array in step 122 and retained in memory until replaced by the next day's information. Lastly, in step 124, the total charge remaining is calculated by subtracting the actual charge delivered from the total charge required.

Actual charge delivered may vary from the calculated charge required due to the special features of the system. In step 116, the hourly charge time is adjusted if a zone sensor 20 reads a temperature greater than 4° F. above the set point. In this case the upcoming hourly charge for that zone will be cut by 50% in step 118. If a zone sensor 20 reads a temperature greater than 4° F. below the set point in step 120, the upcoming charge will be 100% for that zone for that hour in step 122. Finally, if in step 120 a zone sensor 20 reads a temperature of 40° F. or lower, the upcoming hourly charge will be 100% in step 122. This is a freeze protection feature that will come into play even during on-peak hours and the heaters will continue to charge 100% until the temperature rises above 40° F.

The system of this invention is equipped for power failures with battery backup circuit 26 which serves to hold system information. During a power interruption in off-peak or charge time, the battery maintains the amount of required charge remaining to be applied. Once the power is restored to the system, it continues its hourly cycle of recalculating the remaining charge and applying it over the remaining hours. Once the utility meter signal the end of the off-peak period, any remaining charge will be applied at 100% until it is all charged.

It will be apparent to those skilled in the art the various modifications in variations can be made to the thermal storage logic of the present invention and in construction of this thermal storage system without departing from the scope or spirit of the invention.

Other embodiments of the invention will be apparent to those skilled in the art from consideration of the specification and practice of the invention disclosed herein. It is intended that the specification and examples be considered as exemplary only with a true scope and spirit of the invention being indicated by the following claims.

What is claimed is:

1. A method for thermal storage using an apparatus comprising an outdoor temperature sensor and at least one indoor zone temperature sensor, the method comprising the steps of:
   estimating an average on-peak outdoor temperature for tomorrow by adding the average on-peak outdoor temperature for today to the current outdoor temperature minus the outdoor temperature at the same time yesterday;
   estimating the temperature different in each zone between the outside on-peak temperature and the indoor on-peak temperature for that zone for tomorrow by subtracting the estimated average on-peak outdoor temperature for tomorrow from the average set point temperature in the respective zone for today;
   calculating the thermal charge by multiplying yesterday's actual off-peak charge by the estimated temperature different in each zone divided by the average actual temperature in each zone for today's on-peak period;
   adjusting the thermal charge to reduce the charge by 50% if the zone sensor reads a temperature greater than 4° F. above the set point; and
   charging the thermal storage system.

2. The method of claim 1 further comprising the step of adjusting the charge for a 100% of the maximum charge if the temperature read by the zone sensor falls below 40° F. and continuing the charge at a 100% during off-peak or on-peak hours until the temperature rises above 40° F.

3. The method of claim 1, further comprising the step of adjusting the charge for a 100% of the maximum charge if the temperature read by the zone sensor is 4° F. or more below the set point temperature.

* * * * *

UNITED STATES PATENT AND TRADEMARK OFFICE
CERTIFICATE OF CORRECTION

PATENT NO. : 5,178,206
DATED     : January 12, 1993
INVENTOR(S) : David A. SAUNDERS It is certified that error appears in the above-identified patent and that said Letters Patent is hereby corrected as shown below:

```
    Claim 1, column 6, line 10, change "different" to
--difference--; and
                     line 19, change "different" to
--difference--.

Claim 2, column 6, line 26, after "claim 1" insert
--,--.
```

Signed and Sealed this

Seventh Day of December, 1993

Attest:

BRUCE LEHMAN

*Attesting Officer*     *Commissioner of Patents and Trademarks*